(12) United States Patent
Nakatani et al.

(10) Patent No.: US 6,263,735 B1
(45) Date of Patent: Jul. 24, 2001

(54) ACCELERATION SENSOR

(75) Inventors: Masaya Nakatani, Takarazuka; Yuji Yagi, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/284,960

(22) PCT Filed: Sep. 7, 1998

(86) PCT No.: PCT/JP98/03994

§ 371 Date: May 5, 1999

§ 102(e) Date: May 5, 1999

(87) PCT Pub. No.: WO99/13343

PCT Pub. Date: Mar. 18, 1999

(30) Foreign Application Priority Data

Sep. 10, 1997 (JP) .................................................... 9-245048
Jun. 9, 1998 (JP) ................................................. 10-160128
Jun. 12, 1998 (JP) ................................................. 10-164887

(51) Int. Cl.$^7$ .................................................... G01P 15/08
(52) U.S. Cl. .................................. 73/514.36; 73/514.32; 73/514.33; 73/514.34
(58) Field of Search ........................... 73/514.32, 514.33, 73/514.36, 514.18, 514.21, 514.23, 514.34

(56) References Cited

U.S. PATENT DOCUMENTS

| 5,006,487 | | 4/1991 | Stokes | 438/52 |
| 5,060,504 | * | 10/1991 | White et al. | 73/514.33 |
| 5,313,836 | * | 5/1994 | Fujii et al. | 73/514.36 |
| 5,623,099 | * | 4/1997 | Schuster et al. | 73/514.32 |

FOREIGN PATENT DOCUMENTS

| 4-089577 | 3/1992 | (JP) . |
| 4-094186 | 3/1992 | (JP) . |
| 5-119060 | 5/1993 | (JP) . |
| 5-340957 | 12/1993 | (JP) . |
| 6-160420 | 6/1994 | (JP) . |
| 8-181330 | 7/1996 | (JP) . |

* cited by examiner

Primary Examiner—John E. Chapman
(74) Attorney, Agent, or Firm—McDermott, Will, & Emery

(57) ABSTRACT

An acceleration sensor made available without using a high-level semiconductor technology or a micro-machining technology. The sensor detects an acceleration with a high precision, yet the manufacturing cost is inexpensive. In the sensor, a silicon substrate (1) is used only for a portion with which a strain is caused by an acceleration, while an auxiliary substrate (4A,4B), a cap (8A,8B) and a mass substance (6A,6B) are formed of glass material. Joining of the silicon substrate (1) to the mass substance (6A,6B) and the auxiliary substrate (4A,4B), and the auxiliary substrate (4A,4B) to the cap (8A,8B) are made by direct bonding.

11 Claims, 21 Drawing Sheets

FIG. 14(a)
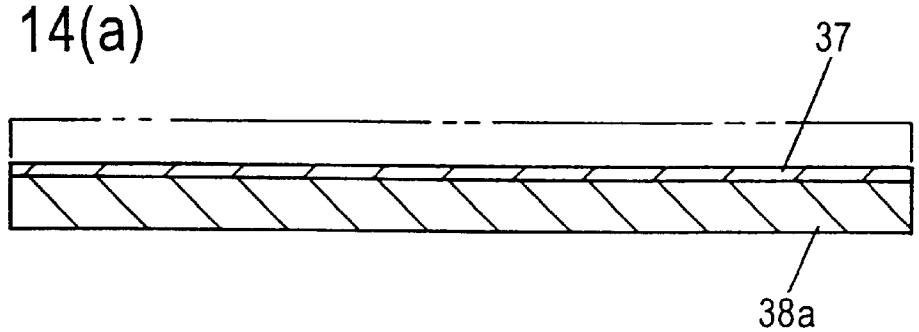
FIG. 14(b)
FIG. 14(c)
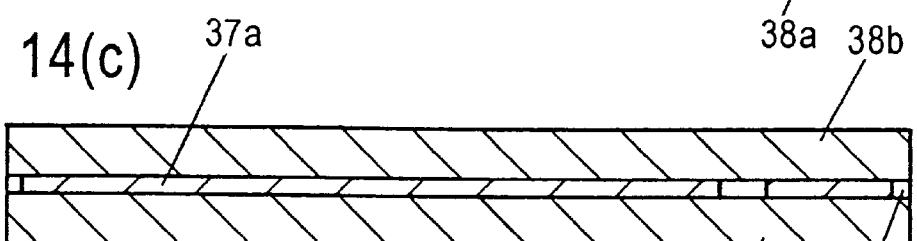
FIG. 14(d)
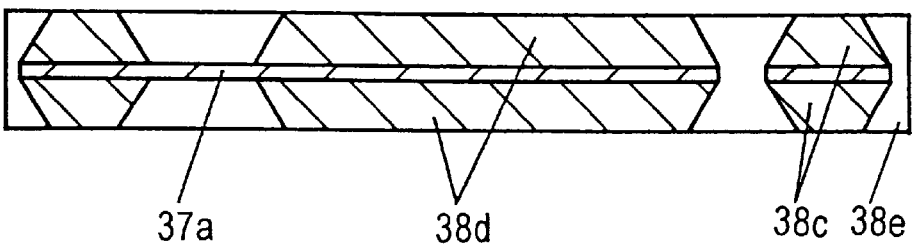

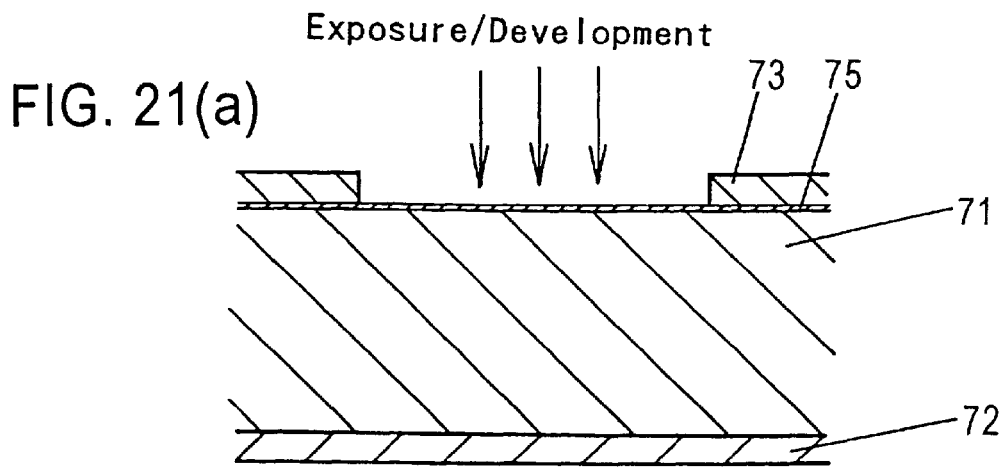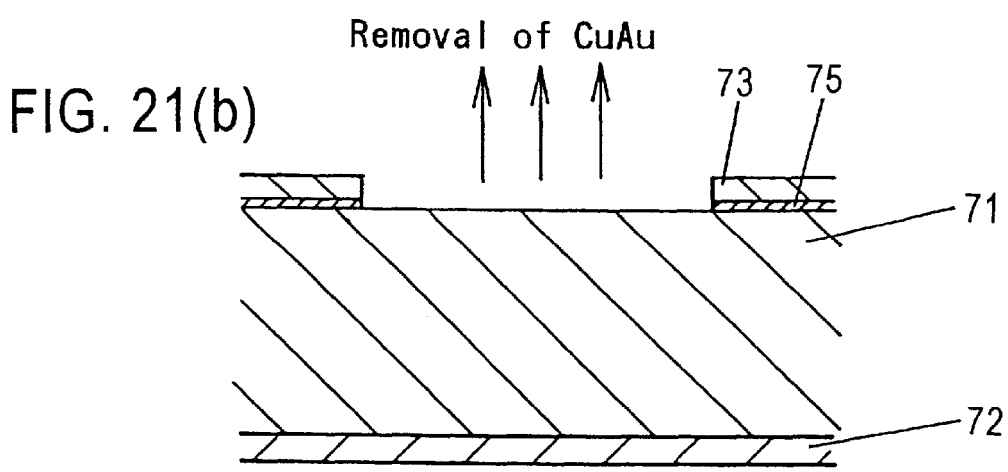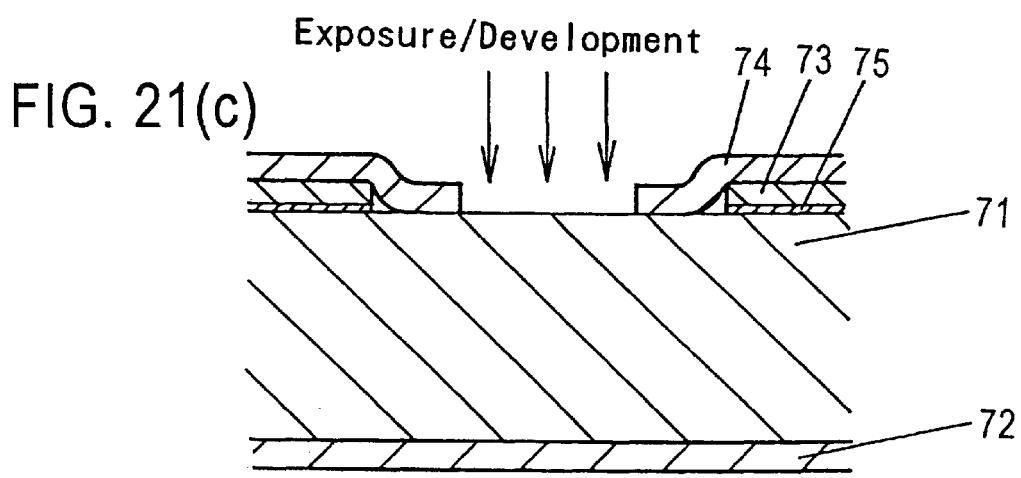

ACCELERATION SENSOR

TECHNICAL FIELD

The present invention relates to an acceleration sensor for use in the control of a vehicle body and the like application fields. The invention also includes the producing method. In accordance with the invention, a high precision acceleration sensor is presented at a low cost, without using high-level semiconductor technologies or micro-machining technologies.

BACKGROUND ART

When an external force is given to a mass substance, acceleration is caused with the mass substance, at the same time an inertial force is observed for trying to retain the mass substance in the same location. The force given to a mass substance and an acceleration can be measured through a physical strain created by the inertial force. There have been a number of teachings on the method of detecting the strain. For example, a publication (Acceleration Sensor by Semiconductor, by Toshitaka SHIBATA, "Technology for Sensor", Vol. 11, No. 10, October, 1991) discloses a sensor formed on a silicon material, which sensor being manufactured using semiconductor technologies and micro-machining technologies. Means for detecting the strain includes the one which makes use of the change in the electrostatic capacitance, and the one which makes use of the piezoresistance effect, for example. Acceleration sensors using a single crystal silicon for the sensing portion have a stable performance and are capable of measuring the acceleration at high precision level. Therefore, the sensors of the above category form the mainstream in the recent field of acceleration sensors.

Processing a silicon substrate with a high precision level into a certain specific shape, however, needs the help of the high-level semiconductor technologies and the micro-machining technologies. Therefore, acceleration sensors are costly at present. Conventional sensors, as taught in a publication (Micromechanical Accelerometer Integrated with MOS Detection Circuitry, KURTE, PETERSEN etc. IEEE TRANSACTION ON ELECTRON DEVICES, VOL. ED-29, No 1, JANUARY 1982) and other publications, contain an etching-stop layer in the silicon substrate, and the monocrystalline silicon has to be epitaxially grown. These are the essential requirements to be fulfilled in order to form a hinge portion, or the portion strained by an acceleration, of a sensor. Expensive semiconductor manufacturing facilities are needed to carry out the above described process steps.

Japanese Laid-open Patent No.05-340957 discloses a method of joining an auxiliary glass substrate to a silicon substrate forming the hinge portion by anode bonding. However, the anode bonding method requires a facility for providing electric fields among the bonding substrates. Furthermore, the anode bonding is available only with a glass that contains sodium. The anode bonding method is not simple to practice, and restrictive in selecting the glass material.

Another type of acceleration sensor uses a piezoelectric element for the portion at which a strain is caused by acceleration. However, it is difficult for an acceleration sensor of the above type to measure a static acceleration; such as the measurement of an inclination relative to the gravity of the earth. In some cases, an acceleration sensor is required to have a self-diagnostic function. Most of such self-diagnostic functions require to have complicated peripheral circuits.

The present invention addresses the above described drawbacks, and aims to offer an inexpensive, yet highly accurate, acceleration sensor formed of silicon and other materials, without asking for the help of the high level semiconductor technologies or the micro-machining technologies. The acceleration sensor in accordance with the present invention covers a wide range of the frequency in acceleration measurement, and is capable of making a self-diagnosis about a disorder. The present invention also offers a method for manufacturing such acceleration sensors.

DISCLOSURE OF THE INVENTION

In an invented acceleration sensor, only the hinge portion of a sensor section, which portion is strained by an acceleration force, is formed of silicon; while the auxiliary portions, a cover and a mass substance for receiving the acceleration are structured of glass or other materials. Joining of the different materials is conducted by direct bonding. The direct bonding is a technology that joins different kinds of materials by simply making the bonding surfaces ultra-clean. The direct bonding technology assures a firm joining between the materials themselves, by making the bonding surfaces clean and heating the surfaces at a high temperature in the atmospheric environment or in the vacuum; without intervening any foreign material, such as an adhesive substance, or providing any electric fields which were essential in the anode bonding. Thus the direct bonding produces a rigid joining at an inexpensive cost. The direct bonding can join silicon, glass, non-alkaline glass, quartz glass and various monocrystalline substrates together.

The hinge portion of said silicon substrate has to be processed to as thin as 10–30 $\mu$m thick. Joining a glass substrate to one surface of the silicon substrate by direct bonding and then grinding only the surface of silicon substrate may provide such a thin silicon substrate. In accordance with a recent grinding technology, a substrate can be ground down to approximately 10 $\mu$m at an accuracy level within ±1 $\mu$m. The accuracy level is high enough for processing the acceleration sensor of the present invention.

After the process for thinning the silicon substrate is finished, another glass plate is joined onto the silicon surface by direct bonding as the auxiliary substrate of the opposite surface. And then, a portion of mass substance for receiving an acceleration and a portion of hinge for yielding a strain are formed through etching process. Finally, a case is bonded from the both sides by direct bonding. The portion of mass substance and the portion of hinge were provided conventionally in the form of a one-piece silicon member manufactured out of a silicon substrate using high level micro-machining technologies. Now in an acceleration sensor of the present invention, the corresponding member is formed of different kinds of materials; glass for the mass substance portion and silicon for the hinge portion. As a result, etching of the member becomes easier, and the whole manufacturing process is simplified. By further providing a piezoelectric element, or a piezoresistive element, formed on the hinge portion, and attaching a glass case having an electrode for electrostatic capacitance in the corresponding area together, an acceleration sensor will have both of the features of electrostatic capacitance type and piezoelectric element type, or piezoresistive element type. Thus, acceleration sensors that can measure the acceleration for a wide range of frequency, capable of making the self-diagnosis can be manufactured efficiently with a high production yield rate.

BRIEF DESCRIPTION OF THE DRAWINGS

FIG. 2(*b*) is a cross sectional view of a conventional capacitance type acceleration sensor.

FIG. 14 shows cross sectional views used to describe manufacturing process steps of the acceleration sensor of embodiment 4.

FIG. 21 shows cross sectional views used to describe method of forming resist patterns in embodiment 8.

BEST MODE FOR CARRYING OUT THE INVENTION

Exemplary embodiments of the present invention are described below with reference to the drawings.

Embodiment 1

Figure 1:
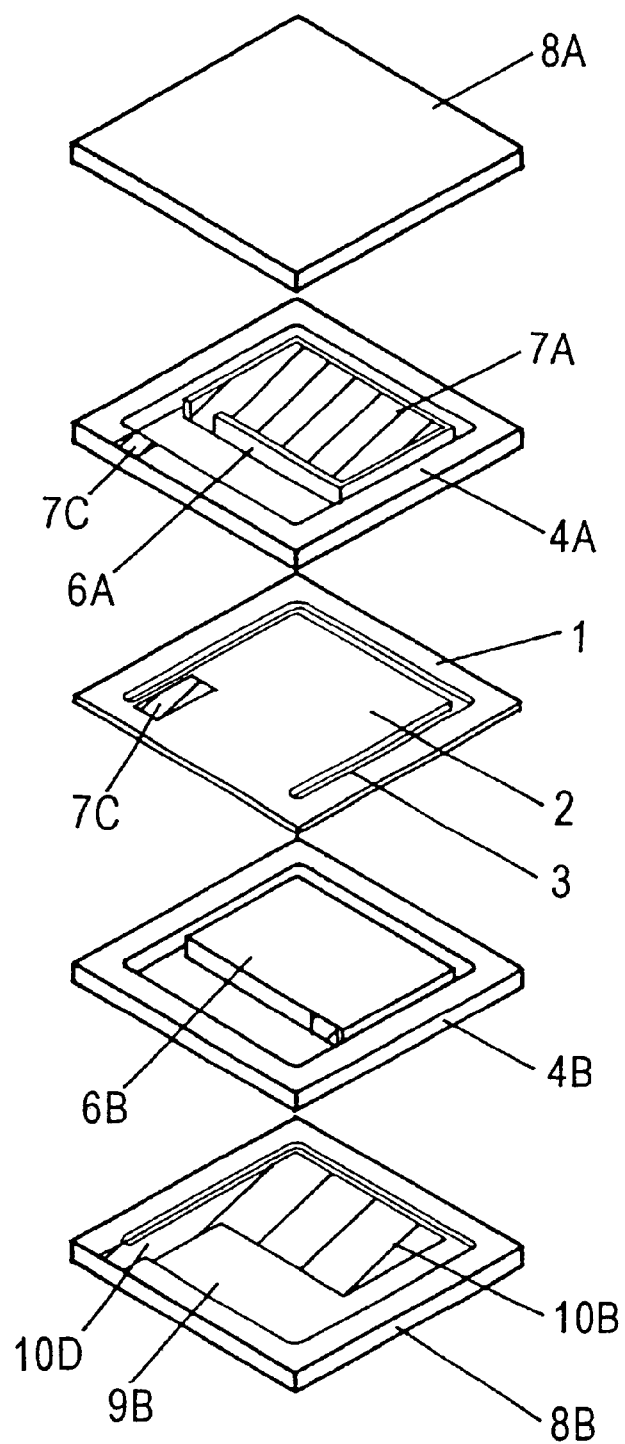
FIG. 1 is an exploded perspective view showing a capacitance type acceleration sensor in accordance with a first exemplary embodiment of the present invention.

FIG. 1 is an exploded perspective view of a capacitance type acceleration sensor in accordance with a first exemplary embodiment of the present invention. A silicon substrate 1 of 10–30 μm thick, a hinge portion 2 of a tongue shape, a slit 3, an auxiliary substrate 4A, 4B for supporting the silicon substrate 1 from both surfaces, a mass substance 6A, 6B joined respectively to both surfaces of the hinge portion 2, a movable electrode 7A, 7B (not shown) formed respectively on the surface of the mass substance 6A, 6B, and a lead electrode 7C, 7D (not shown) for the movable electrode are illustrated. In a cap 8A, 8B for encapsulating a sensor section formed of the silicon substrate 1 and the auxiliary substrate 4A, 4B, a hollow area 9A (not shown), 9B is formed. A fixed electrode 10A (not shown), 10B is formed on the surface of the hollow area in a place opposing to the movable electrode 7A, 7B (not shown), and a lead electrode 10C (not shown), 10D for the fixed electrode is formed at a place in the opposite end relative to the lead electrode 7C, 7D (not shown) for the movable electrode.

Figure 2A:
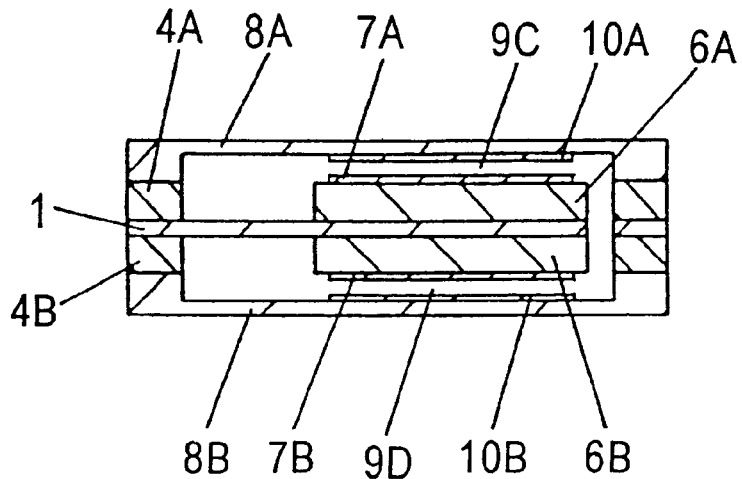
FIG. 2(*a*) is a cross sectional view of the capacitance type acceleration sensor.
Figure 2B:
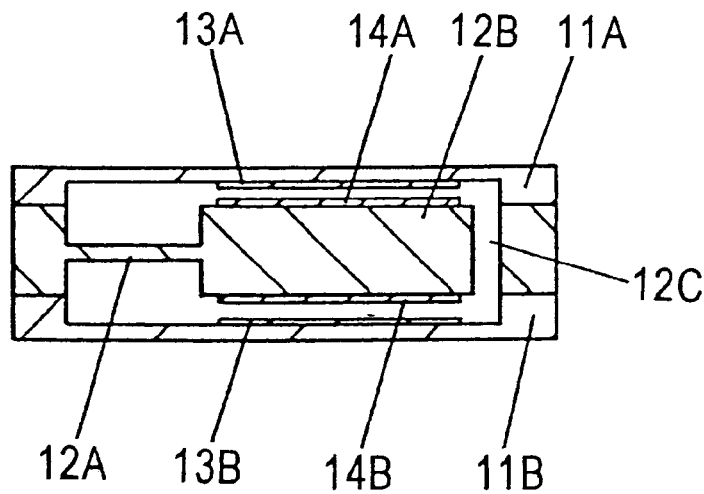

FIG. 2(*a*) is a cross sectional view of the capacitance type acceleration sensor. The silicon substrate 1 as thin as 10–30 μm thick can move in the up/down (in the drawing) direction. Upon receiving an acceleration force, the mass substance 6A, 6B moves up/down, and the movable electrode 7A, 7B moves accordingly. Because of the change in a gap 9C, 9D between the movable electrode 7A, 7B and the fixed electrode 10A, 10B, the electrostatic capacitance formed between the movable electrode 7A and the fixed electrode 10A, and that formed between the movable electrode 7B and the fixed electrode 10B change. The acceleration given to is detected in the form of a change in the electrostatic capacitance.

Just for information, a conventional capacitance type acceleration sensor is shown in FIG. 2(*b*). Conventionally, a hinge portion 12A and a mass substance 12B for yielding a strain in response to an acceleration were formed as a one-piece silicon structure. In order to provide a member of the above structure, a high-level process control is needed for thoroughly removing only the region corresponding to a groove 12C, while keeping the region corresponding to the hinge portion 12A left unremoved for the thickness 10–30 μm. In FIG. 2(*b*), the symbol 11A, 11B denotes a cap, 13A, 13B is a fixed electrode, 14A, 14B is a movable electrode.

Now in the following, a method of manufacturing an acceleration sensor is described in accordance with the present embodiment 1. FIG. 3(*a*)–FIG. 3(*e*) illustrate process steps for manufacturing a sensor section, which moves in response to acceleration.

In the first place, an auxiliary glass substrate 16A and a silicon substrate 17 are joined together by direct bonding (FIG. 3(*a*)). The direct bonding technology does not require any adhesive or any foreign material, nor does it require any electric fields between the bonding materials which are the essential requirement in the anode bonding technology. The direct bonding provides a firm joining by simply, keeping the state of the surfaces of bonding materials at a high precision level and clean, and then heating these materials in the atmospheric environment or in the vacuum. It is an excellent bonding technology of low cost. Silicon, glass, non-alkaline glass, quartz glass and various monocrystalline substrates can be joined by direct bonding. Therefore, the present invention may be embodied in other forms using other materials. A preferred temperature and time of heating for the direct bonding between silicon and glass, for example, are 300–500° C. for 1–2 hours.

Figure 3A:
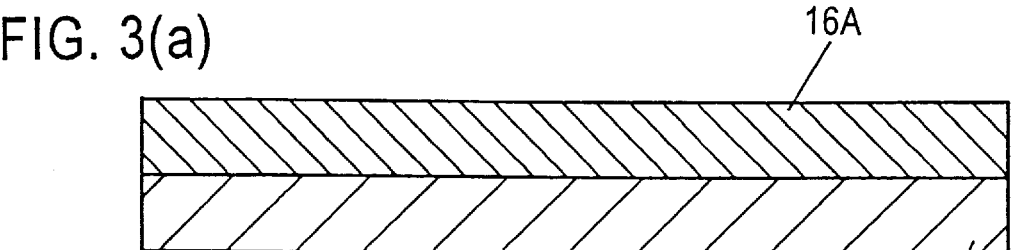
FIG. 3 shows cross sectional views used to describe the manufacturing process steps of the capacitance type acceleration sensor of embodiment 1.
Figure 3B:
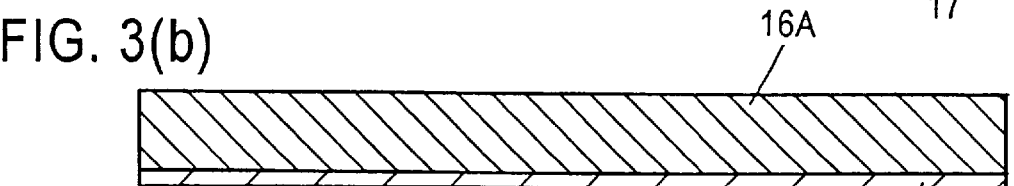
Figure 3C:
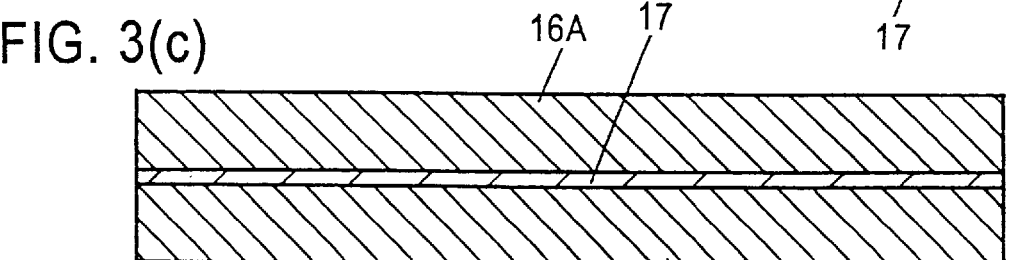
Figure 3D:
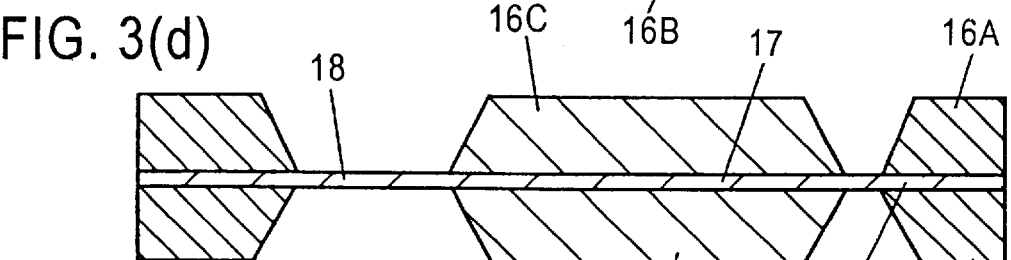

The surface of silicon substrate 17 is ground down to a certain specified thickness (FIG. 3(b)). A recent grinding technology assures the accuracy level within ±1 μm for the thickness of 10 μm. This means that the presently available grinding technique is enough for implementing the acceleration sensor. The surface of silicon substrate 17 is polished to a mirror surface in the final stage. Then, an auxiliary glass substrate 16B is joined on the surface of silicon substrate 17 by direct bonding (FIG. 3(c)). The auxiliary substrate 16A, 16B is etched to form the mass substance 16C, 16D (FIG. 3(d)). It is advantageous to select and use an appropriate etchant, with which the glass functions as the etching stopper. An etching mask (not shown) is provided so as to leave the silicon substrate 17 unetched only in a hinge portion 18 of a tongue shape. A slit 19 is thus formed by etching (FIG. 3(e)).

Figure 4A:
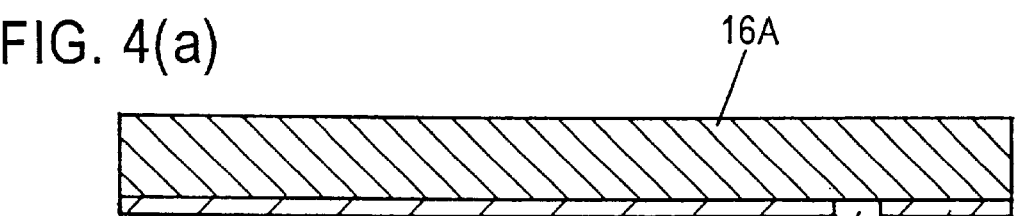
FIG. 4 shows cross sectional views used to describe other manufacturing process steps of the capacitance type acceleration sensor of embodiment 1.
Figure 4B:
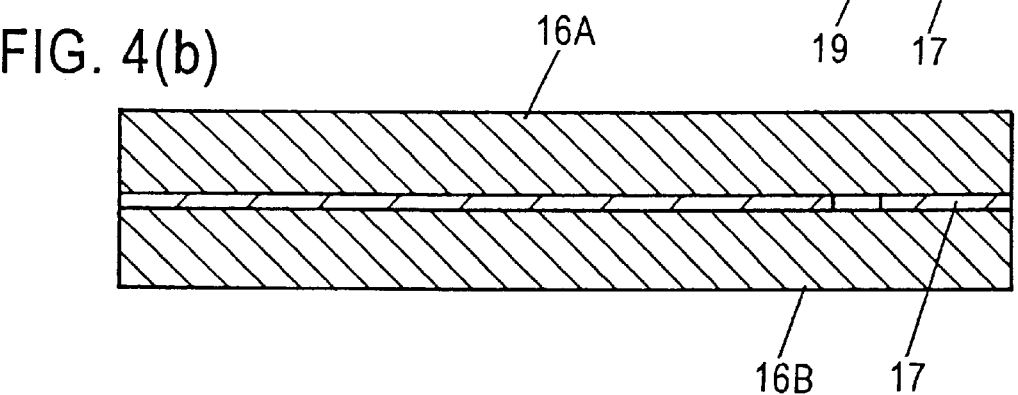

As an alternative procedure for forming the slit 19 in the silicon substrate 17, the slit 19 may be formed by etching before the auxiliary substrate 16B is joined by direct bonding, as shown in FIG. 4. In this procedure, it is easy to apply an etching mask for etching the silicon substrate 17, because the etching surface does not have any bump created by the auxiliary substrate 16B.

Figure 5A:
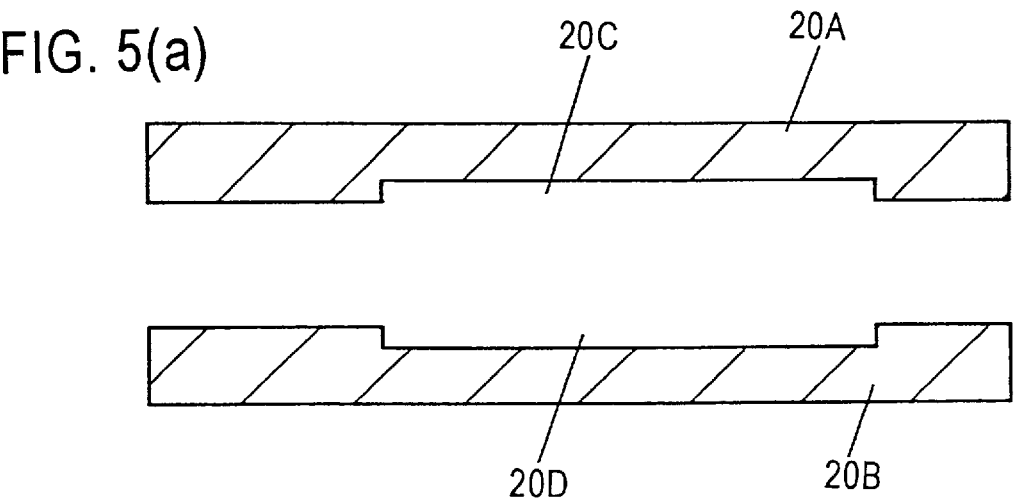
FIG. 5 shows cross sectional views used to describe process steps of manufacturing a case of the acceleration sensor of embodiment 1.
Figure 5B:
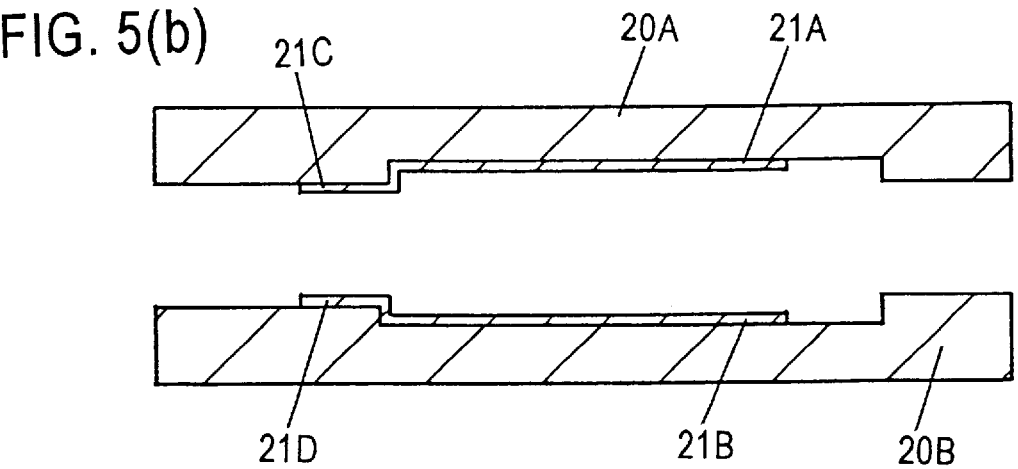
Figure 6:
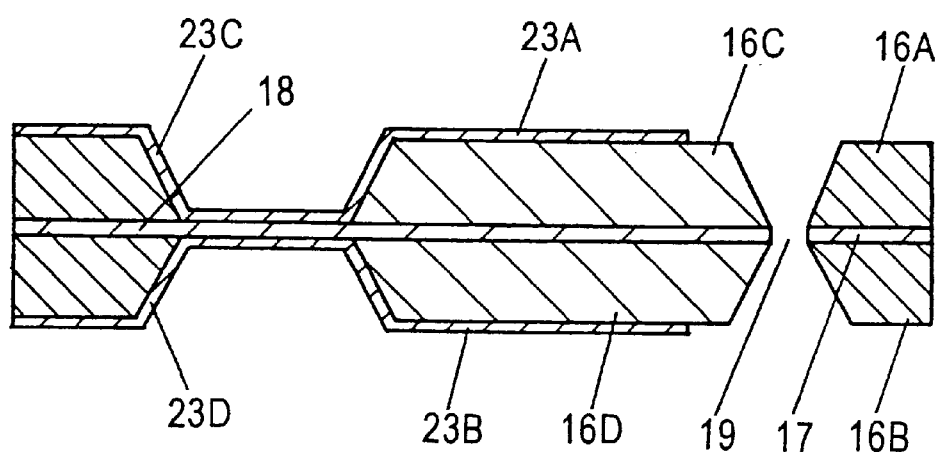
FIG. 6 shows a cross sectional view used to describe a sensor section of the acceleration sensor of embodiment 1.
Figure 7:
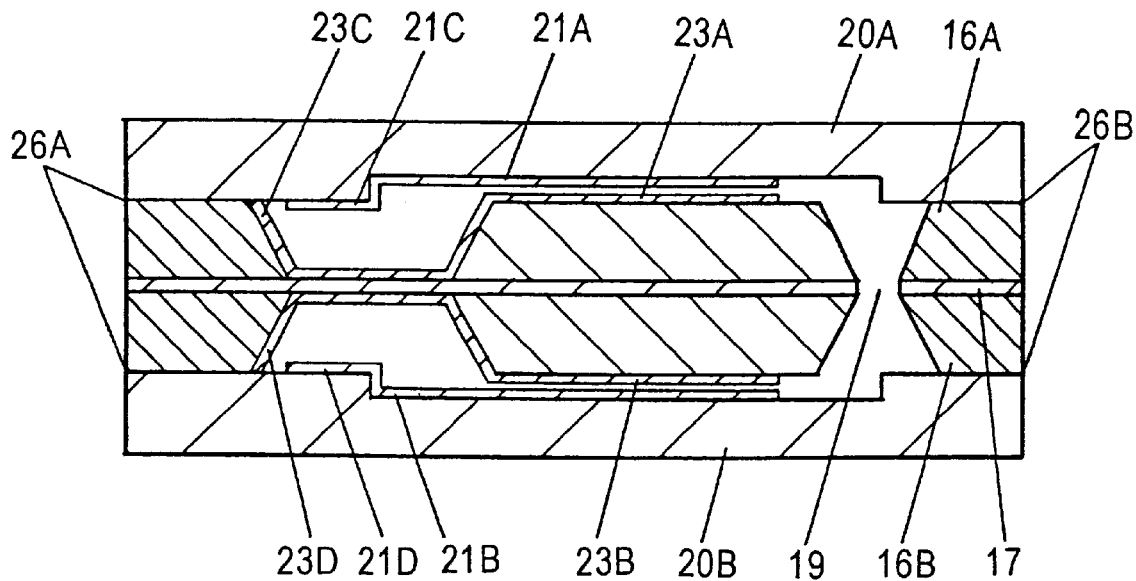
FIG. 7 is a cross sectional view of the finished acceleration sensor of embodiment 1.

In addition to the sensor section, a case section is prepared as shown in FIG. 5(a), (b). A hollow area 20C, 20D is provided in a glass cap 20A, 20B (FIG. 5(a)), and a fixed electrode 21A, 21B is formed on the bottom surface, as well as a lead electrode 21C, 21D for the fixed electrode (FIG. 5(b)). A movable electrode 23A, 23B and a lead electrode 23C, 23D for the movable electrode are formed also on the sensor section. Finally, the sensor section and the case section are joined by direct bonding to complete a capacitance type acceleration sensor, as shown in FIG. 7.

Besides the above described methods of leading the fixed electrode 21A, 21B and the movable electrode 23A, 23B out, the electrodes may be lead outside also through the joint at a side face 26B, instead of the side face 26A only. Perforating a through hole in the case substrate may be another means of leading the electrode out. Any way, the electrode leading means is not limited to those described in the above.

Although a glass plate has been used for the auxiliary substrate in the present embodiment 1, it is not intended to limit the material to the glass. Besides glass, a substrate of amorphous material such as quartz glass, or a monocrystalline substrate such as crystal may be used for the same effect. If there are certain specific requirements in the temperature characteristics of a material of the sensor, it is an advantage that in the present invention a most appropriate material can be selected among the group of materials.

Figure 8:
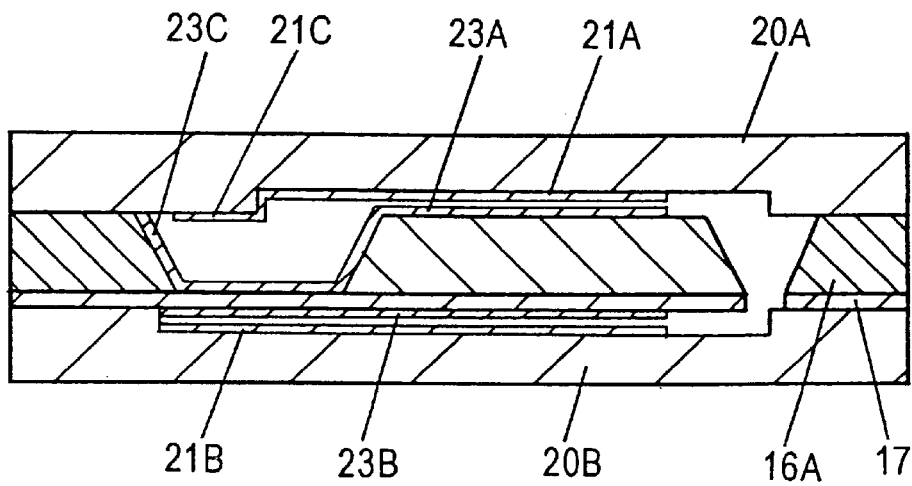
FIG. 8 is a cross sectional view of the acceleration sensor of embodiment 1, in which the mass substance is provided only on one surface.

The auxiliary substrate has been provided at both surfaces of the silicon substrate in the present embodiment 1. However, the auxiliary substrate may be provided only at one surface of the silicon substrate if the symmetrical structure is not considered essential. Namely, a capacitance type acceleration sensor having the auxiliary substrate 16A only at one surface, as shown in FIG. 8, may also be structured. Eliminating one bonding process for joining the auxiliary substrate contributes to simplify the total procedure.

Embodiment 2

Figure 3E:
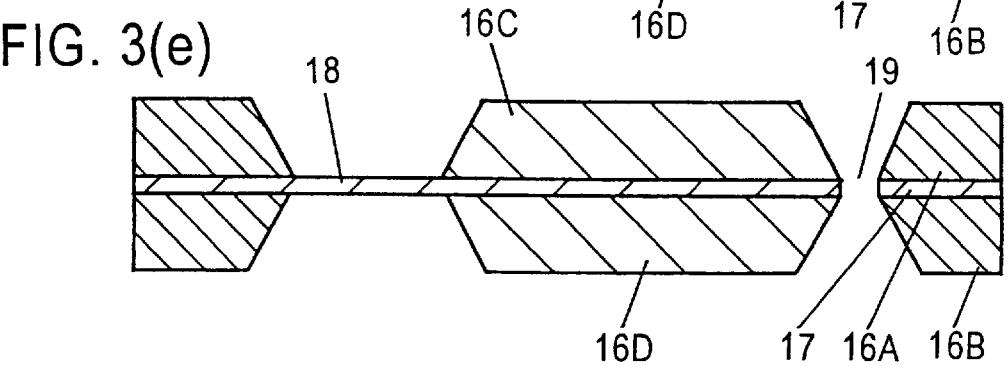

An acceleration sensor in accordance with a second embodiment of the present invention is that of embodiment 1, wherein, at the process step of FIG. 3(e), a piezoresistive material, or a material which changes its electrical characteristics in accordance with strain, is formed in the region where a strain is caused by an acceleration. The piezoresistive material may be provided through a commonly used semiconductor technology, such as the sputtering, the ion implantation, etc.

Figure 9:
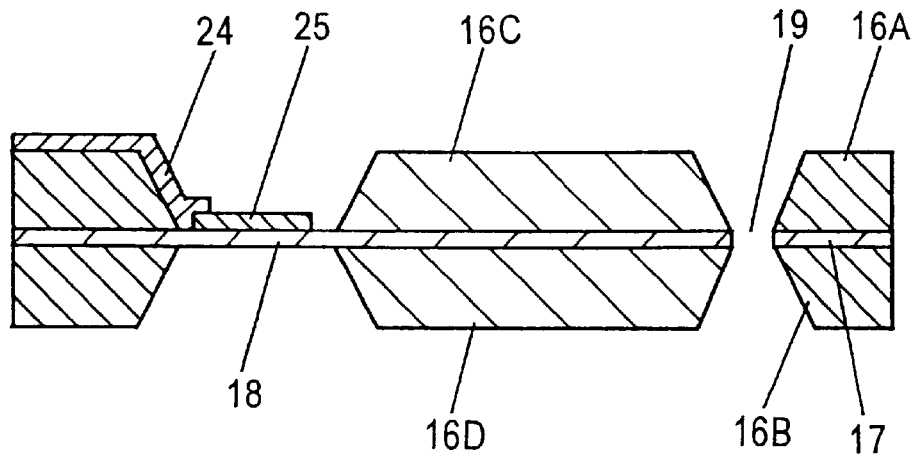
FIG. 9 is a cross sectional view showing a sensor section of a piezoresistive type acceleration sensor in accordance with a second exemplary embodiment of the present invention.

FIG. 9 shows the structure of a sensor section thus formed. The silicon substrate 17 is held supported by the auxiliary glass substrate 16A, 16B, and a piezoresistive element 25 and a lead electrode 24 are formed on the hinge portion 18 of a tongue shape. The piezoresistive element changes its resistance value in accordance with strain. The acceleration effected to the mass substance 16C, 16D can be measured by reading the change in the resistance value of the piezoresistive element 25. The piezoresistive element 25 may be provided on any of the either surface. Encapsulating the sensor section with glass cap in the same way as in embodiment 1 completes a piezoresistive type acceleration sensor.

In place of the glass used for the auxiliary substrate, materials other than the glass may be used, like in the case of embodiment 1. The auxiliary substrate may be provided only on one surface. The advantages of such configuration remain the same as in the embodiment 1.

The piezoresistive element 25 may be replaced with a piezoelectric element. The piezoelectric element changes its resonance impedance, or resonance frequency, by a strain effected thereon. The acceleration effected to the sensor section can be measured by reading the value of the change. The piezoelectric element may be formed through a commonly used process, such as the sputtering.

Embodiment 3

Figure 10:
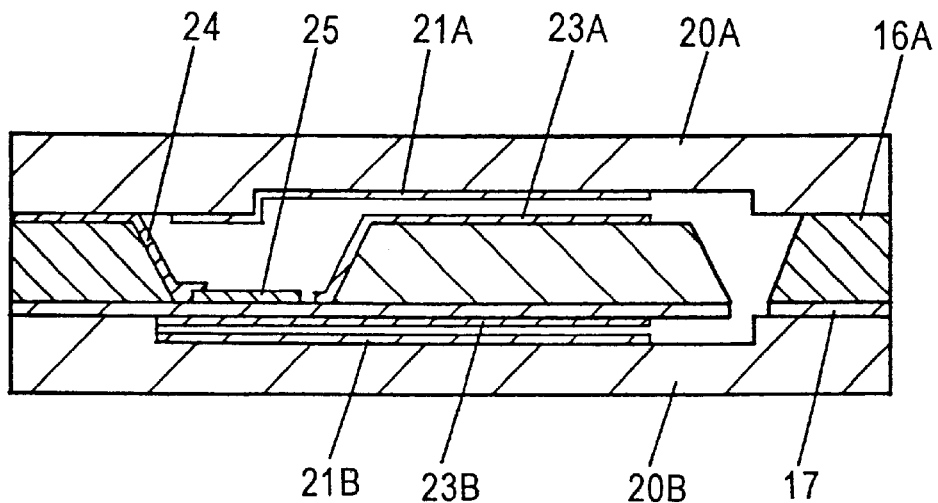
FIG. 10 is a cross sectional view showing a sensor section of a complex type acceleration sensor in accordance with a third exemplary embodiment of the present invention.

An acceleration sensor in accordance with a third exemplary embodiment of the present invention is a combination of the embodiment 1 and the embodiment 2. FIG. 10 shows a cross sectional view of the acceleration sensor of embodiment 3. There is no limitation in the formation order for forming a piezoresistive element, or a piezoelectric element. There is no limitation either as to whether the auxiliary substrate should be provided either one surface alone or on the both surfaces. What is to be done is to form a piezoresistive element 25, or a piezoelectric element, and a lead electrode 24 before joining the upper and the lower caps of electrostatic capacitance type.

In accordance with the present embodiment 3, an acceleration sensor may be provided simultaneously with the sensor functions of multiple types, the electrostatic capacitance type and the piezoresistive type, or the piezoelectric type. In a combination of the electrostatic capacitance type sensor and the piezoelectric type sensor, for example, a static acceleration may be measured by the electrostatic capacitance type sensor, while a dynamic acceleration by the piezoelectric type sensor. Thus the advantages of the respective type sensors are made available, and an acceleration sensor can measure acceleration covering a wide range of frequencies. Furthermore, as a result of combination of the two types of sensors, operational errors or failure occurred in one type sensor may be judged by the other type sensor.

Embodiment 4

Figure 11:
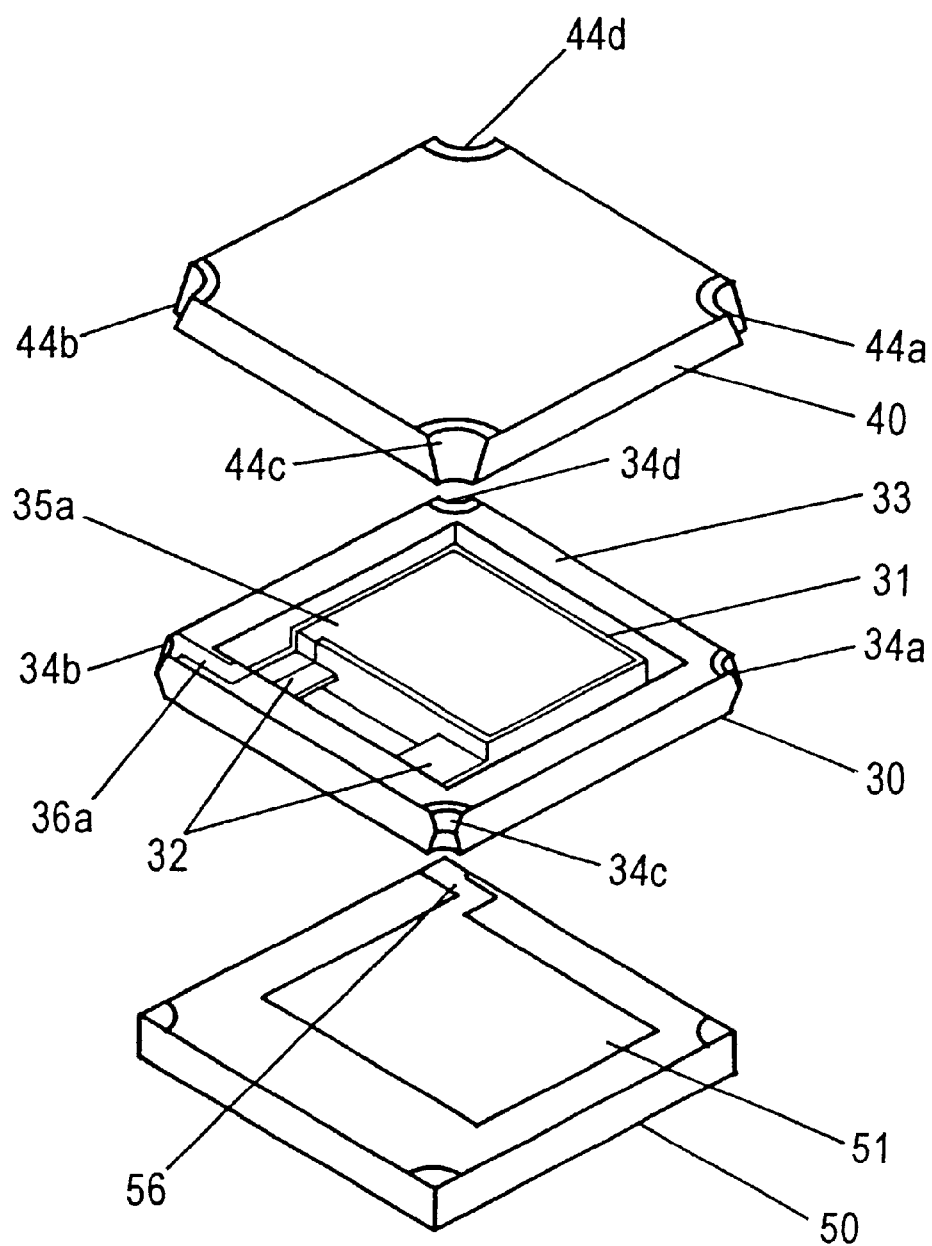
FIG. 11 is an exploded perspective view showing an acceleration sensor of a fourth exemplary embodiment of the present invention.

Now in the following, how the output of sensor section of the above described sensors is taken to the outside of a device in a sure and easy manner is described with reference to the drawing. FIG. 11 is an exploded perspective view showing a fourth exemplary embodiment of the present invention.

Referring to FIG. 11, a sensor section 30 comprises a mass substance 31, a hinge portion 32, and a frame 33. On the respective surfaces of a first cap 40 and a second cap 50, a first fixed electrode 41 (not shown) and a second fixed electrode 51 are formed corresponding to a first movable electrode 35a and a second movable electrode 35b (not shown). The first and the second caps 40, 50 are not provided with the hollow area, which existed in the embodiments 1–3. Instead, in the present embodiment 4, a space has been secured within the sensor section 30 for the mass substance 31 to make the up/down motion. An acceleration sensor may take either one of the structures, that of embodiments 1–3 or that of embodiment 4.

On the sidewall of a first through hole 34a–34d provided at the four corners of the frame 33, an electrode film is formed. In one of the four grooves (34b in FIG. 11), a first lead electrode 36a for the first movable electrode 35a is formed. On the reverse surface of the sensor section 30, a second movable electrode 35b (not shown in FIG. 11) is provided, and its lead electrode (a second lead electrode 36b, not shown) is taken to a location (34c, for example) other than that of the first lead electrode 36a.

At the four corners of the first cap 40, a second groove 44a–44d is provided corresponding to the location of the first groove 34a–34d in the frame 33. Also on the sidewall of which groove 44a–44c, an electrode film is formed. A first fixed electrode 41 (not shown) is formed on the reverse surface of the first cap 40. A third lead electrode 46 (not shown) for the first fixed electrode 41 is taken to a place (a second groove 44a, for example) other than that of first lead electrode 36a and that of second lead electrode 36b.

On the second cap 50, an electrode film is provided in a place corresponding to the first groove 34a–34d. A fourth lead electrode 56 for the second fixed electrode 51 is provided in a place (on the electrode film of second cap 50 corresponding to first groove 34d, for example) other than that of first lead electrode 36a, that of second lead electrode 36b and that of third lead electrode 46. After the sensor section 30, the first cap 40 and the second cap 50 are formed to their respective configurations, these members are bonded together. And then, the grooves 34a–34d and 44a–44d at the four corners are filled with an electroconductive paste to form output terminals of the acceleration sensor.

Figure 12:
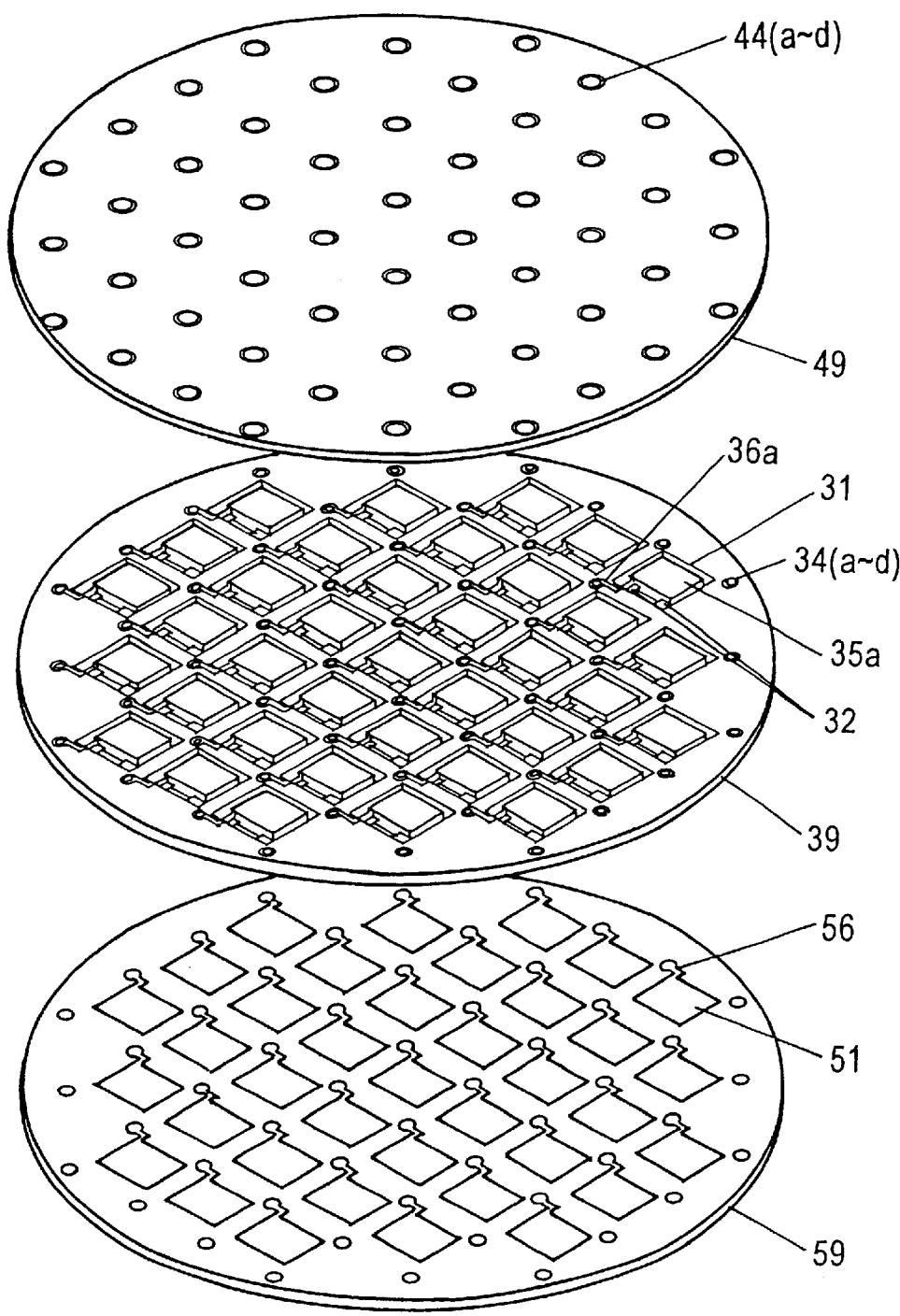
FIG. 12 is a perspective view used to show the manufacturing process of the acceleration sensor of embodiment 4.

Now referring to FIG. 12, a method of manufacturing an acceleration sensor of the present embodiment 4 is described. A plurality of sensor sections 30, a plurality of first caps 40 and a plurality of second caps 50 are formed, respectively, on a substrate 39 for the formation of sensor section, a substrate 49 for the formation of first cap and a substrate 59 for the formation of second cap. Each of the three substrates undergoes all the procedures as it is in the form of a wafer before they are bonded together to be separated into individual pieces. By so doing, the acceleration sensors are manufactured efficiently maintaining a high accuracy level. Before describing an exemplary method of forming the sensor section 30 on substrate 39, the outline of the whole process steps up to the separation are described below.

Figure 13:
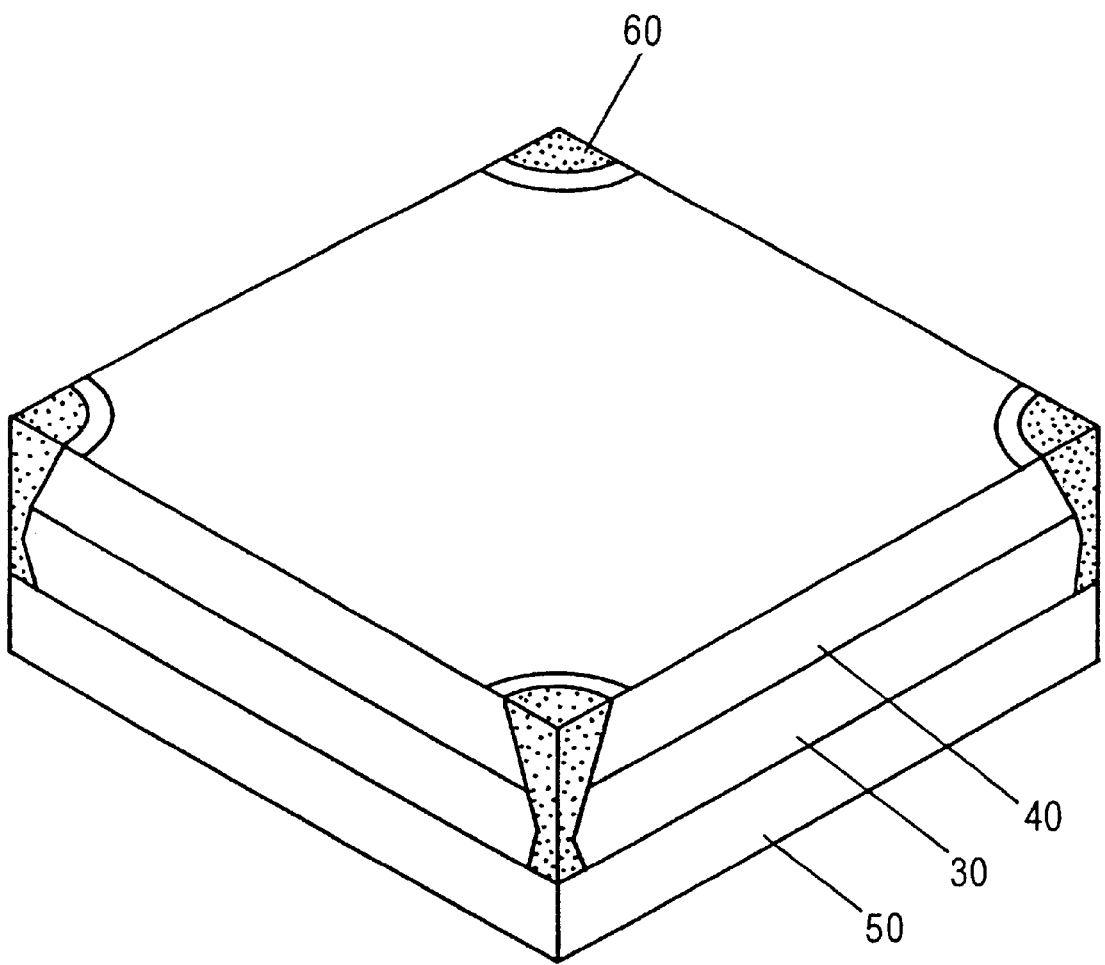
FIG. 13 is a perspective view showing the acceleration sensor of embodiment 4.

An electrode film is formed on both surfaces of the substrate 39 for the formation of sensor section and the substrate 49 for the formation of first cap, and on one surface of the substrate 59 for the formation of second cap, by deposition of Cr/Au, Ti/Au or the like material in vacuum. Then, these substrates are joined together by direct bonding. After the bonding, an electroconductive paste is poured into the through holes from second through hole 44a–44d, and hardened. The wafers bonded together to form a single piece is separated into individual pieces using a dicing saw or the like facility. A finished acceleration sensor manufactured through the above procedure is shown in FIG. 13.

Next, the outline of an exemplary method of forming the sensor section is described in the following with reference to FIG. 14. A silicon substrate 37 having an insulating oxide film on the surface and a glass substrate (lower) 38a are joined together by direct bonding. The silicon surface is ground to be a thin plate (FIG. 14(a)). Then, the hinge portion 37a and the groove (silicon substrate) 37b are formed on the silicon substrate 37 (FIG. 14(b)). The wet etching process or the dry etching process may be used for the formation.

Another glass substrate (upper) 38b is direct bonded on the ground surface of the silicon substrate 37 (FIG. 14(c)). Then it undergoes the sand blasting process, or the wet etching process, so as only the frame portion 38c and the mass substance 38d remain unblasted on the glass substrate 38a, 38b (FIG. 14(d)). Simultaneously, a groove (glass substrate) 38e is formed.

Although it is not shown in the drawing, a cut is provided by etching or the like method in the place where a lead electrode is formed. This is aimed to prevent the lead electrode from intervening in the space of direct bonding between the substrates. The use of the sand blasting process, or the wet etching process, for the formation of the glass substrate (FIG. 14(d)) produces a bowl shaped taper in the cross section of the glass substrate. The tapered shape is advantageous in forming and connecting the electrodes on the upper and the lower surfaces. A similar advantage is provided by the use of the sand blasting process, or the wet etching process, for perforating the second through hole in the first cap. Thus each of the lead electrodes are locating on one surface, and the electrode for output has a relatively large size, as illustrated in FIG. 13. This is an advantageous factor for increasing the efficiency in the wire bonding and other operations.

The above described method of forming a sensor section is an example. Alternative methods may be considered by changing the sequence of process steps, or the sensor section may be formed by using the methods as described in the above embodiments 1–3. Or, an equivalent shape may be formed on a piece substrate of silicon through a fine pattern technology using etching process. In this case, use of an anisotropic wet etching process is effective. Although the shape of one-end support has been described in the foregoing, it can also take a shape of both-end support, or it can be supported by a plurality of supports for producing the same effect.

Embodiment 5

Figure 15:
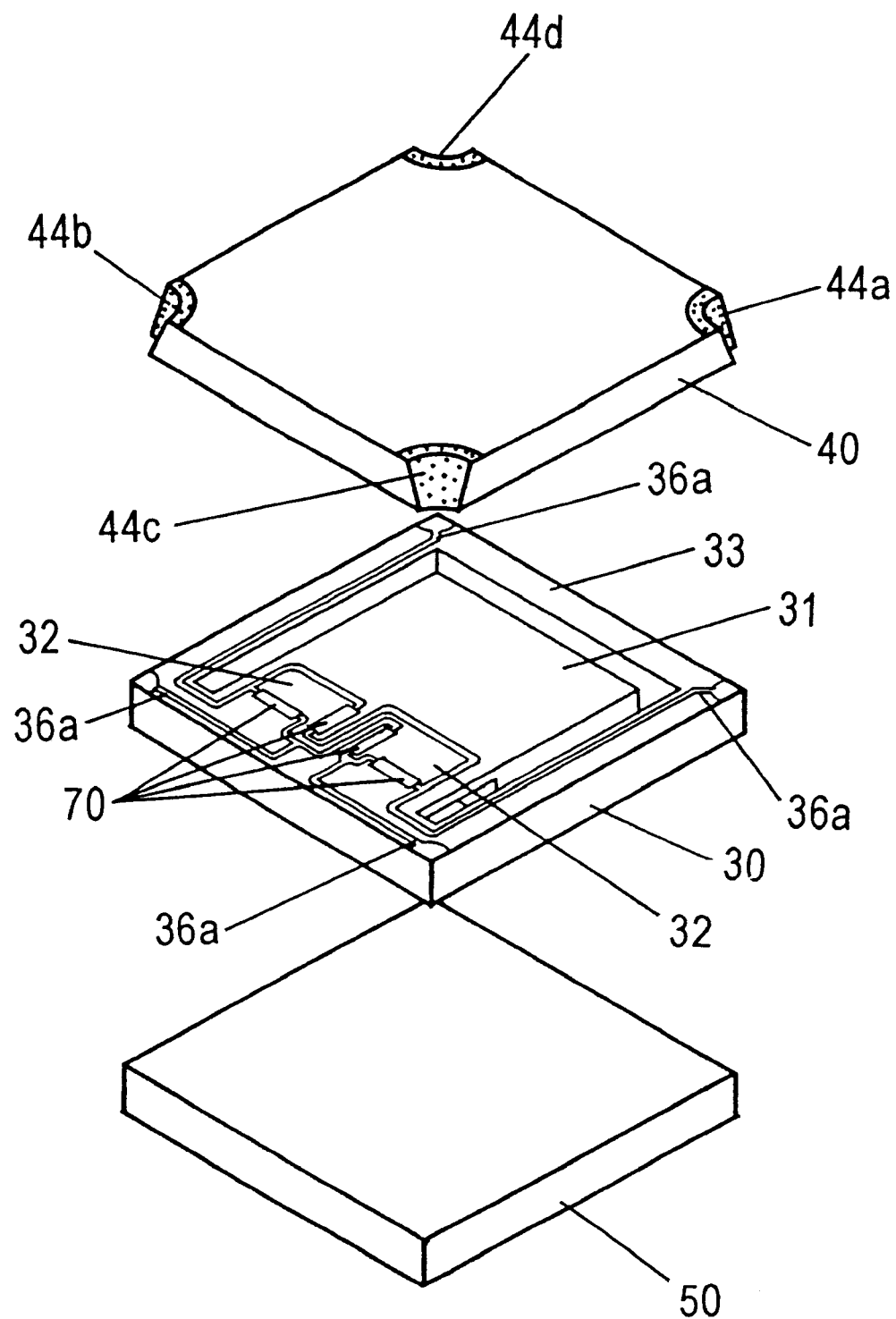
FIG. 15 is an exploded perspective view showing an acceleration sensor in accordance with a fifth exemplary embodiment of the present invention.

An acceleration sensor in accordance with a fifth exemplary embodiment of the present invention is the one having a structure similar to that of the embodiment 2, wherein a piezoresistive element or a piezoelectric element is used in the sensor section. Substantially, there is no significant difference as compared with the acceleration sensor of embodiment 4. Numeral 70 denotes the piezoresistive element, the piezoelectric element, in FIG. 15. As all of the electrodes are located concentrated on one plane, there is no need for a lead electrode going down to the second cap 50. The lead electrode is needed only for the connection in the level of sensor section 30 and higher.

Embodiment 6

Figure 16:
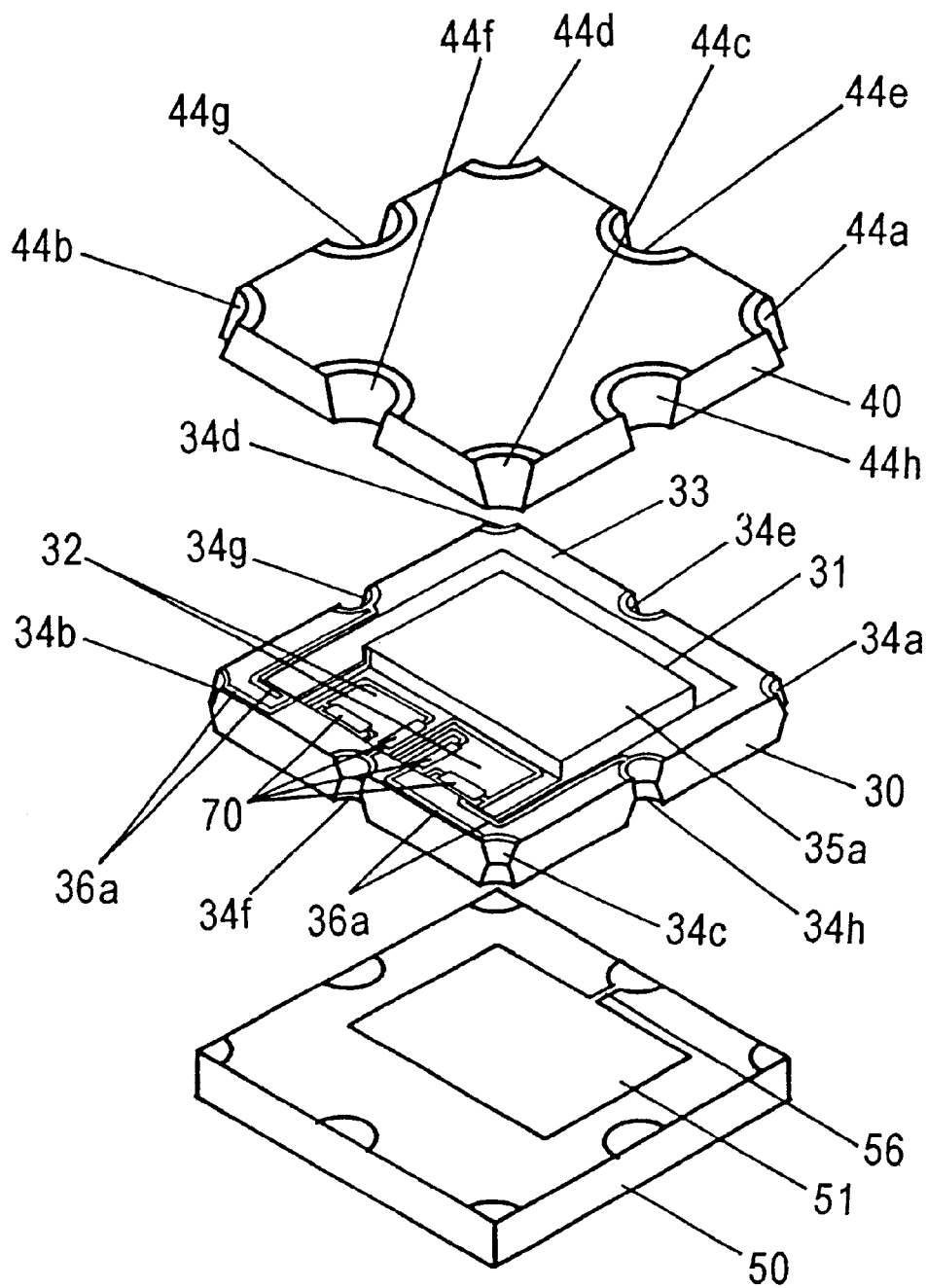
FIG. 16 is an exploded perspective view showing an acceleration sensor in accordance with a sixth exemplary embodiment of the present invention.

An acceleration sensor in accordance with a sixth exemplary embodiment of the present invention relates to an acceleration sensor of a higher precision level. The sensor section of which acceleration sensor, having a similar structure as that of the embodiment 3, comprises a combination of an electrostatic capacitance type structure and a piezoresistive element, or a piezoelectric element. Basically, there is no substantial difference as compared with the embodiment 4. By simply increasing the number of the through holes, similar effects as those of the embodiment 4 are produced. As illustrated in FIG. 16, additional grooves (34e–34h, 44e–44h) are provided in the respective four sides, besides the grooves (34a–34d, 44a–44d) of embodiment 4 provided at the four corners of the device. The relevant lead electrodes are formed in an arrangement where the connection becomes the shortest.

Despite the additional functions, the number of process steps regarding the lead electrode does not increase in the present embodiment 6. So the added functions do not invite an increased manufacturing cost in this respect.

Embodiment 7

Figure 17:
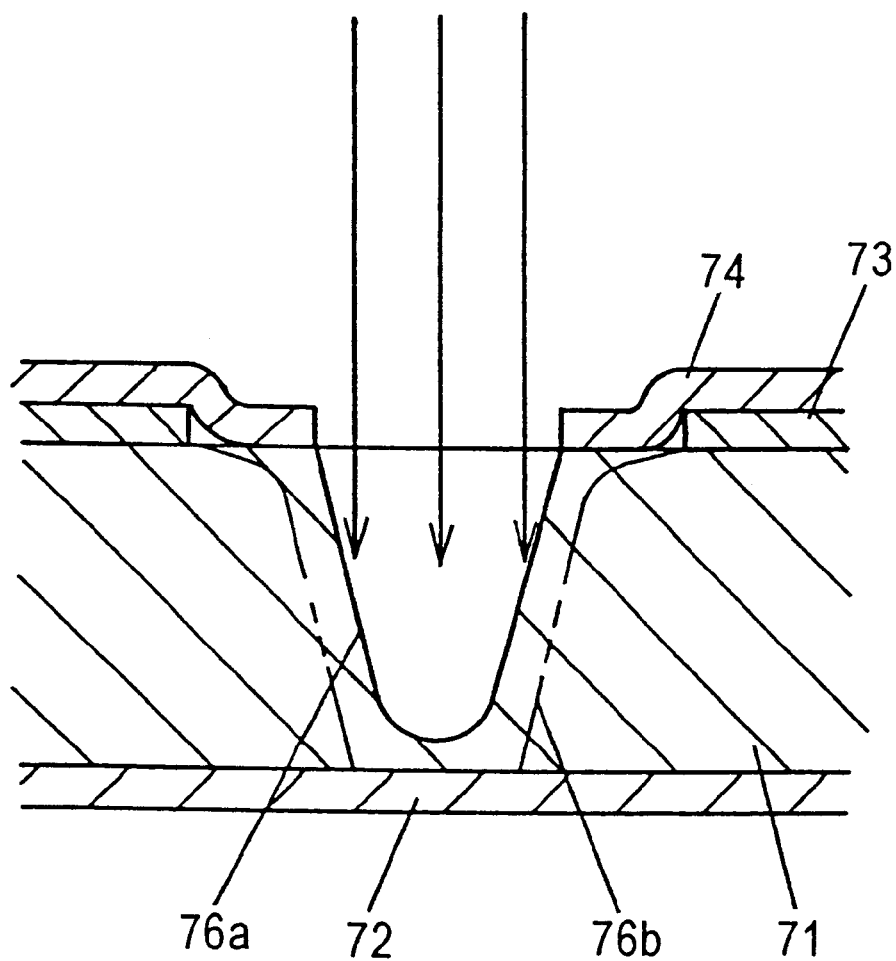
FIG. 17 is a cross sectional view used to describe manufacturing process of an acceleration sensor in accordance with a seventh exemplary embodiment of the present invention.
Figure 18A:
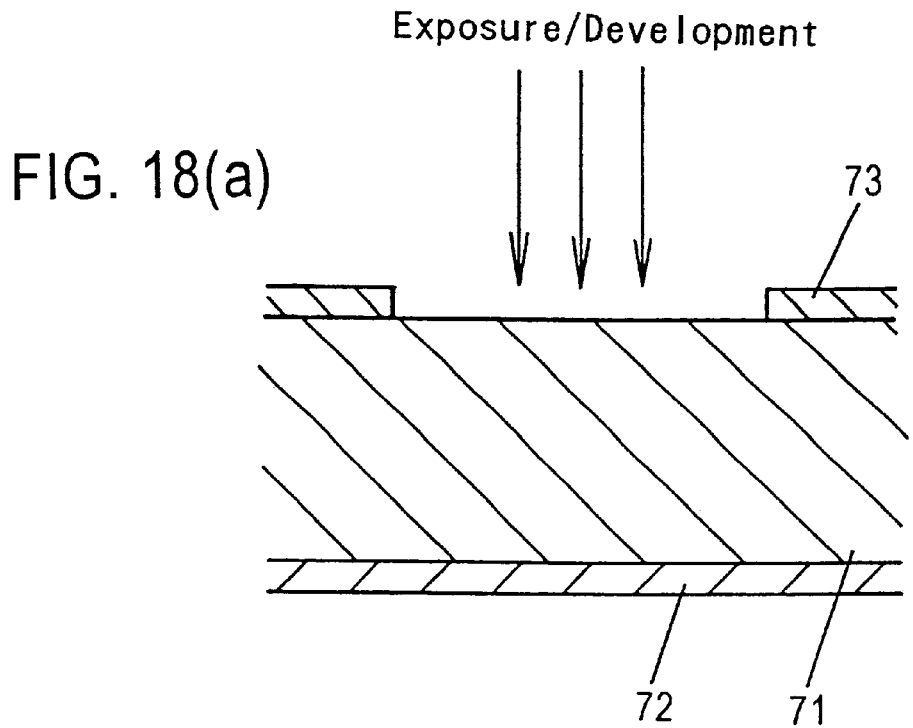
FIG. 18 shows cross sectional views used to describe method of forming resist patterns in embodiment 7.
Figure 18B:
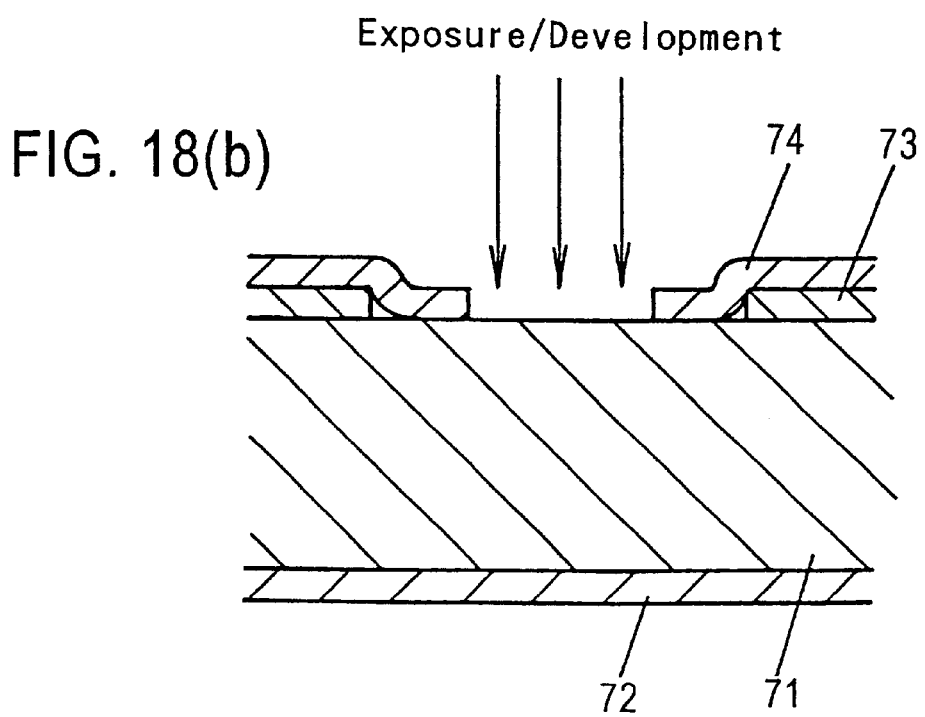
Figure 19:
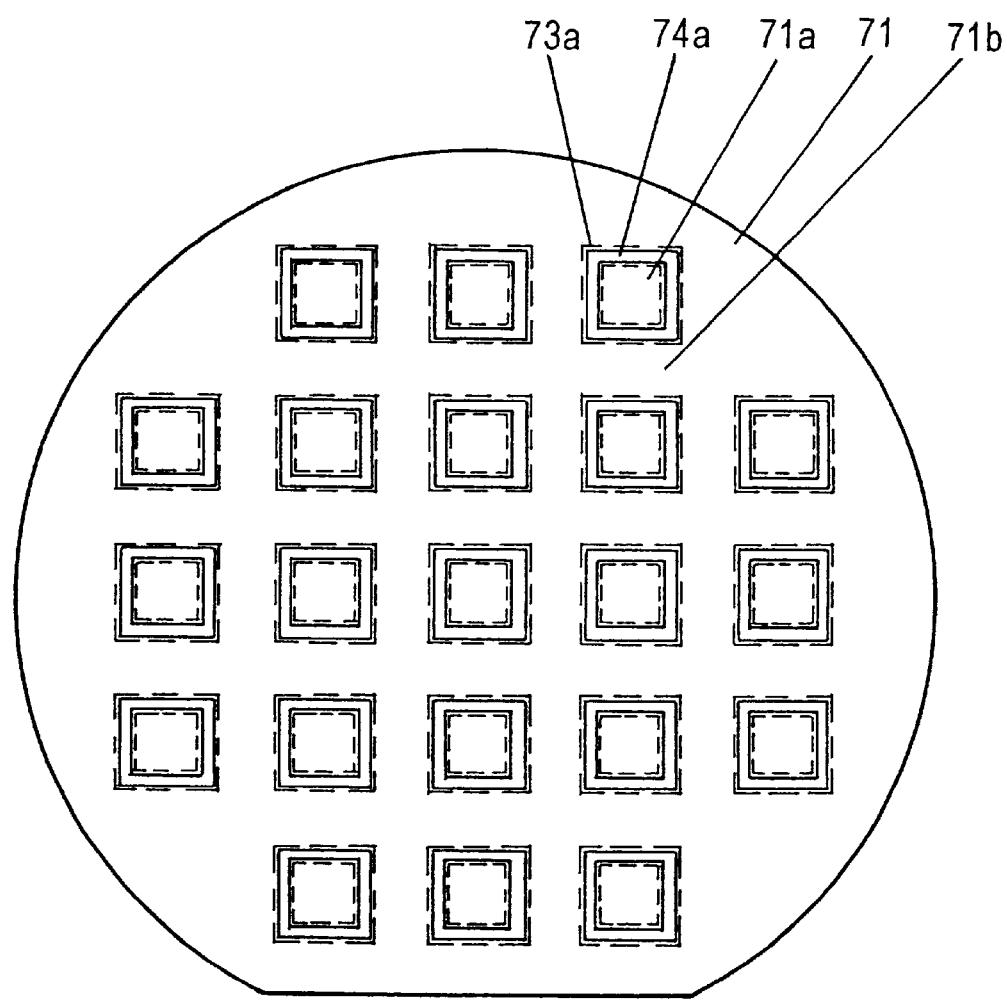
FIG. 19 shows a resist pattern on a wafer of embodiment 7.

The mechanical and chemical methods for forming the hinge portion, the mass substance and the frame of the above acceleration sensor are described referring to the drawings. FIG. 17 is a cross sectional view used to describe a seventh exemplary embodiment of the present invention. FIG. 18 shows cross sectional views used to describe the formation of respective resist patterns in embodiment 7. FIG. 19 is the resist pattern as seen on a wafer.

In FIG. 17, a glass substrate 71, a silicon substrate 72, a wet etching resist 73, and a sand blasting resist 74 are shown. In FIG. 19, a mass substance 71a, an auxiliary substrate 71b, a wet etching resist pattern 73a and a sand blasting resist pattern 74a are shown.

As shown in FIG. 18, a wet etching resist 73 is coated on the glass substrate 71, which resist is exposed and developed to form a pattern. On top of the wet etching resist 73, a sand blasting resist 74 is applied, which resist is also exposed and developed to form a pattern that provides an open area smaller than that in the pattern of the wet etching resist 73. FIG. 19 shows an appearance of the resist patterns formed on a wafer as viewed from the surface of glass substrate. As shown in FIG. 17, the wafer is sandblasted up to just before penetration of the glass substrate 71 (numeral 76a represents the processing line by the sand blasting). The wafer in this stage is immersed in an etchant, liquid containing ammonium bifluoide, to have the glass substrate 71 penetrated through (numeral 76b represents the processing line by the wet etching).

Penetrating a glass plate of approximately 400 $\mu$m thick by sand blasting is an established process. In the present processing, the silicon substrate 72 has to be maintained unattacked. The mechanical process like the sand blasting, however, is unable to conduct a selective processing, where the materials are processed in accordance with the difference in the kind of material. Therefore, the sand blasting has to be discontinued just before the penetration of the glass substrate 71. As the dispersion of processing pertinent to the sand blasting is approximately 20–30 $\mu$m, it is preferred to stop the sand blasting leaving 30–50 $\mu$m of glass substrate 71 before the penetration.

The remaining glass of 30–50 $\mu$m thick is etched off by wet etching until the glass substrate 71 is penetrated through. For the wet etching, a liquid containing ammonium bifluoride is used as the etchant; the etching rate of which etchant with the glass substrate 71 is remarkably different relative to that with the silicon substrate 72. In the above described wet etching process, only the glass substrate 71 is etched, while the silicon substrate 72 is hardly attacked. During the wet etching process, the wet etching resist 73 provided between the glass substrate 71 and the sand blasting resist 74 protects the surface of the mass substance 71a and the auxiliary substrate 71b from the attack of the etchant.

Because the size of the open area of the sand blasting resist pattern 74a is smaller than that of the wet etching resist pattern 73a, the blasting powder does not intrude into interfacial space between the wet etching resist and the glass substrate to give damage on the tight adhesion of the wet etching resist 73. Therefore, the effectiveness of wet etching resist can be fully utilized, allowing to process up to the limit of processing, 50 $\mu$m. Thus, the remaining 50 $\mu$m can be processed under the above described structure.

Embodiment 8

Figure 20:
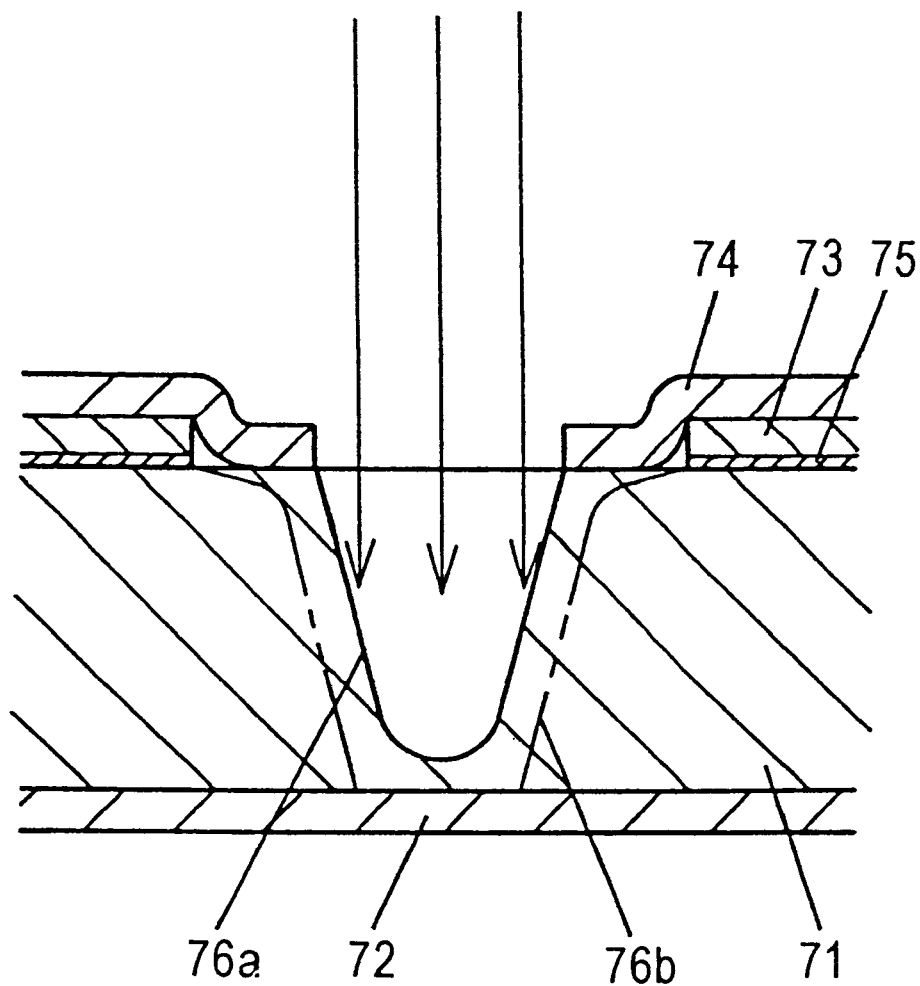
FIG. 20 is a cross sectional view used to describe manufacturing process of an acceleration sensor in accordance with an eighth exemplary embodiment of the present invention.

Method of manufacturing an acceleration sensor in accordance with an eighth exemplary embodiment of the present invention is described referring to the drawings. FIG. 20 is a cross sectional view used to describe the present embodiment 8. FIG. 21 shows cross sectional views used to describe formation of respective resist patterns of the present embodiment 8. The point of difference with the FIG. 20 and FIG. 21 as compared with the counterparts of embodiment 7 is the existence of a film 75 formed mainly of Au.

As shown in FIG. 20, a film 75 formed mainly of Au is provided between the wet etching resist 73 and the glass substrate 71. Method of forming the pattern of film 75 is illustrated in FIG. 21. In the first place, a film 75 is formed over the entire surface of the glass substrate 71. On top of the film 75, a wet etching resist 73 is coated, which is exposed and developed to form a pattern. And then the film 75 undergoes an etching process. A sand blasting resist 74 is applied to form a pattern, which pattern having an open area smaller than that in the pattern of wet etching resist 73. The glass substrate 71 is processed, as illustrated in FIG. 20, by the sand blasting and the wet etching, as used in embodiment 7.

The film 75 formed mainly of Au used as the protection film enables the wet etching to go through at least 100 $\mu$m. Or, the wet etching can process to a depth far deeper than in the embodiment 7. According to actual observation on the surface after etching, the influence of side etching is smaller than in the method of embodiment 7. Therefore, a margin for the border region can be made smaller; which leads to a smaller device size. When a wet etching resist is immersed in an etchant for a long time, it gets wet at the edge and swollen. The etching liquid invading into a space between the glass substrate and the wet etching resist attacks the surface of glass substrate. Whereas, such a metal mask as Au is not ill affected by the etchant. This seems to be a reason of the good surface condition after etching.

In the embodiments 7 and 8, description has been made based on the sensor section having a two-layered structure of the glass substrate and the silicon substrate, as represented by the structure shown in FIG. 8. However, the same effects are produced also with a three-layered sensor section formed of a silicon substrate sandwiched by two glass substrates, as represented by the structure shown in FIG. 7.

Although a two-layered sensor formed of a glass substrate and a silicon substrate has been used in the embodiments 7 and 8, the kind of material is not limited to the above two materials. Other materials may also be used for the same effect, in so far as these materials allow a selective etching under an appropriate etchant and the other material allows mechanical processing such as sand blasting. Then, a deep and precise groove may be formed on one substrate with ease.

A normal sand blasting resist in the state as it is formed is not capable of withstanding a sand blasting process to a depth approximately 400 µm, because of insufficient adhesion. However, if a post baking is applied on the resist in the embodiments 7 and 8, the adhesion is strengthened and the depth of processing can be made a step deeper. The preferred conditions for the post baking are: not lower than 100° C., not shorter than 30 min.

Embodiment 9

Figure 22:
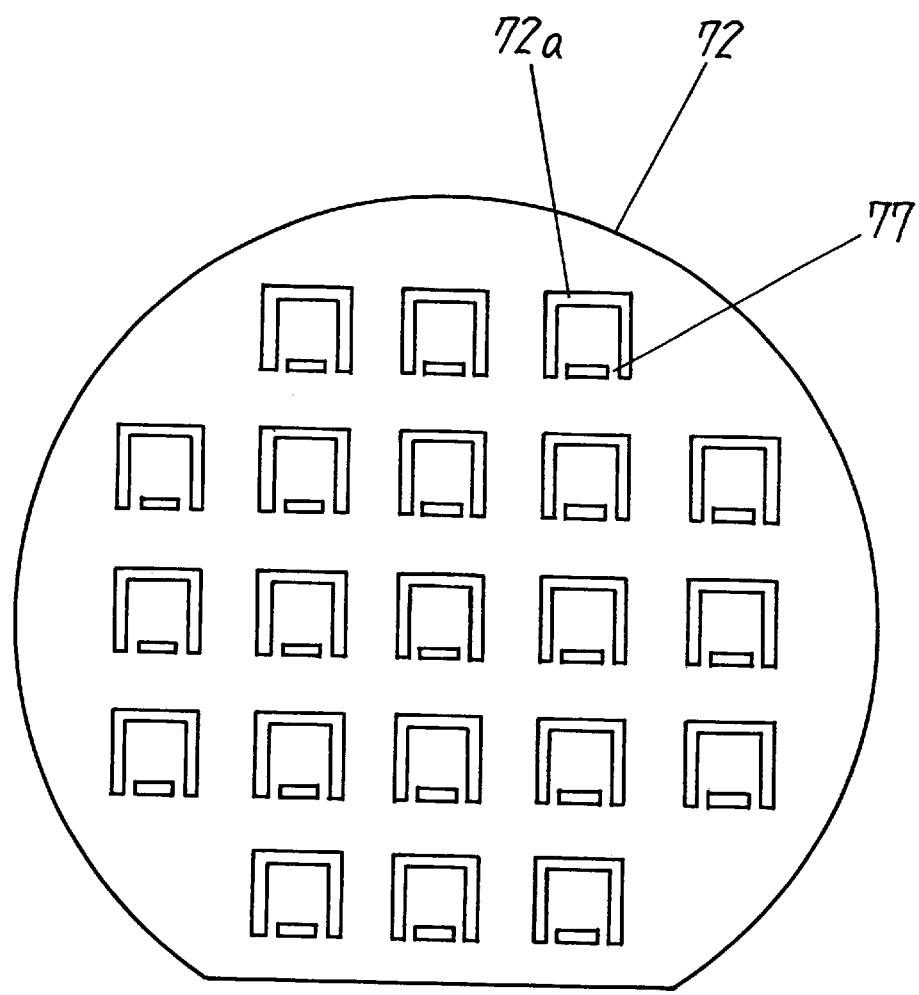
FIG. 22 shows a pattern on a silicon substrate of an acceleration sensor in accordance with a ninth embodiment of the present invention, as viewed in a wafer state.

An ninth exemplary embodiment of the present invention is described with reference to the drawings. FIG. 22 shows a pattern of the silicon substrate as observed on a wafer. In FIG. 22, a silicon substrate 72, a pattern 72a on the silicon substrate, and a hinge portion 77 are shown.

The pattern in FIG. 22 is almost identical to the shape of the sand blasting resist pattern 74a in FIG. 19, with the exception of the hinge portion 77 of silicon substrate pattern 72a. In the present embodiment 9, the silicon substrate pattern 72a is formed in the first place, and then the glass substrate pattern is formed by the method used in the embodiments 7 and 8.

Providing in advance the pattern, which is substantially identical to the pattern to be formed on a glass substrate, on the silicon substrate as a sort of the negative mask makes it possible to conduct wet etching from the silicon substrate side, instead of being limited to processing from the glass substrate side only. Thus the processing time can be reduced, and the border of processing limit expanded.

Embodiment 10

Figure 23:
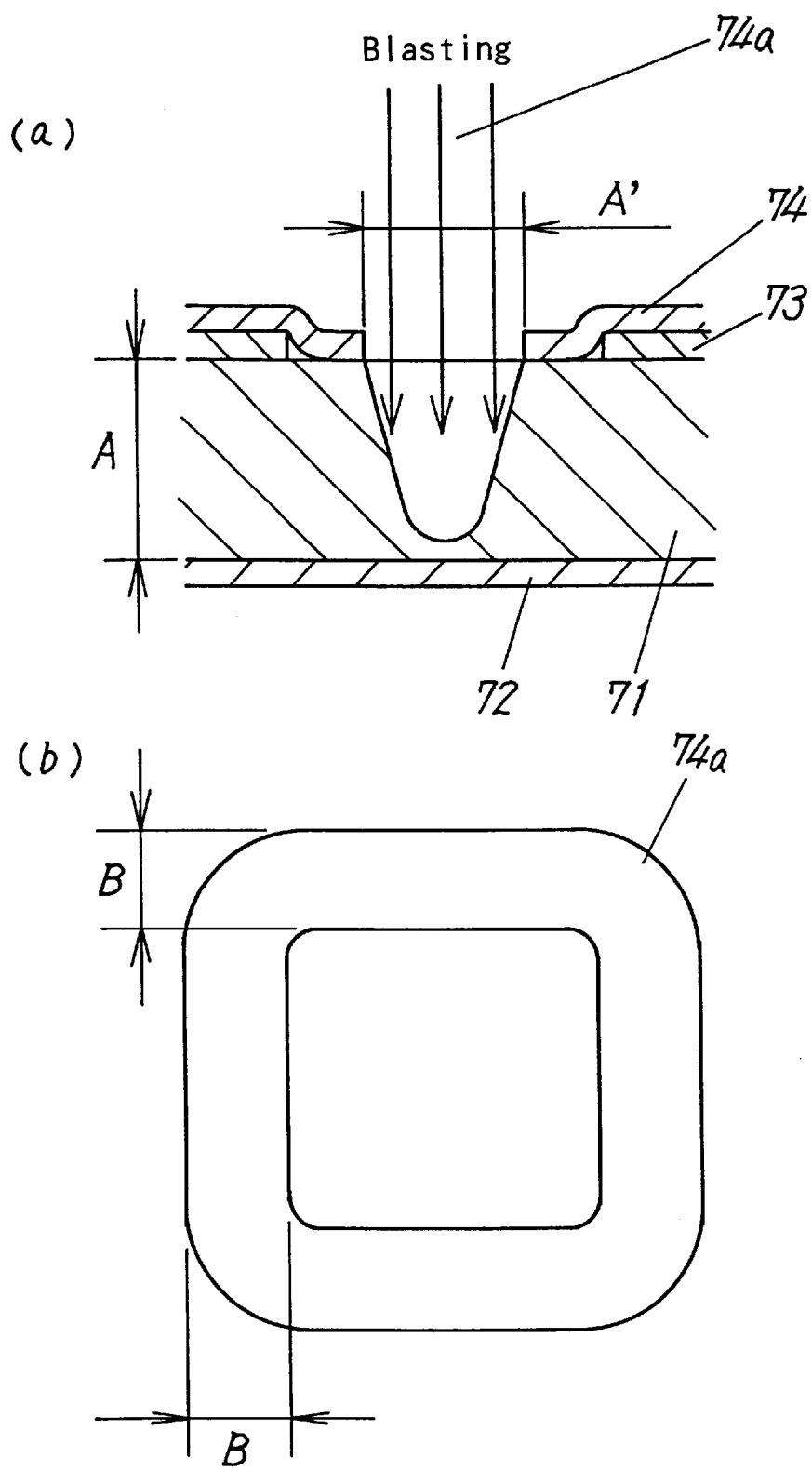
FIG. 23 illustrates manufacturing process steps of an acceleration sensor in accordance with a tenth exemplary embodiment of the present invention.

A tenth exemplary embodiment of the present invention is described referring to the drawing. FIG. 23 is drawings used to describe the tenth embodiment.

The present embodiment 10 relates to the sandblasting resist pattern. A glass substrate is processed by the sand blasting until just before the penetration, and then finished by the wet etching process. If the sand blasting has a wide dispersion the sand blasting process has to be stopped at an early stage. This means the increased amount of remaining glass substrate that needs processing until the penetration. The amount of remaining glass substrate processed by the wet etching process increases accordingly.

When a processing is carried out on devices in the state of a wafer, a suitable shape has to be selected in order to suppress the depth cut out from the glass substrate during the processing to a smallest possible level. As illustrated in FIG. 23, an open lane of the sand blasting resist pattern 74a should preferably have such a shape that fulfils the requirement: Lane width A' is not smaller than the thickness A of the glass substrate, or, the lane width B is uniform within a wafer.

In applying the sand blasting on a substrate in the direction of thickness, if the width of a processing pattern is narrow the process rate significantly drops, because it is difficult in the narrow lane for the blasting powder to reach to the end. The depth cut out from the glass substrate may be controlled within a smallest possible range if the sand blasting resist pattern is formed to meet the requirement described above.

INDUSTRIAL APPLICABILITY

A mass substance and a hinge portion of an acceleration sensor were provided conventionally as a onepiece member of a silicon substrate processed by a high level micromachining technology. In the invented acceleration sensor, the mass substance and the hinge portion can be formed respectively of different materials. As the result, the processing of material by etching becomes easier. The present invention also enables to offer an acceleration sensor that contains in it two different types of sensing systems together; containing an electrostatic capacitance type element combined with a piezoresistive element, or an electrostatic capacitance type element combined with a piezoelectric element. Therefore, an acceleration sensor that has a self-diagnosis function against a failure may be manufactured with ease at a high production yield rate.

What is claimed is:

1. An acceleration sensor comprising:
a sensor section, which section comprising a silicon substrate provided with a slit so as a tongue shape segment is formed thereon, a mass substance formed from a material that is different than said tongue shape segment, said mass substance provided on one surface or both surfaces of said tongue shape segment at an end part and a movable electrode formed on a surface of said mass substance; and
a cap substrate having a hollow in an area facing said mass substance and a fixed electrode formed on a surface of the hollow,
wherein said sensor section is held supported by said cap substrate, and
said silicon substrate and said mass substance as well as said sensor section and said cap substrate, respectively, are joined together by direct bonding.

2. The acceleration sensor of claim 1, further comprising a piezoresistive element or a piezoelectric element which changes its electrical characteristic in accordance with a strain disposed on said straining portion of the tongue shape segment.

3. The acceleration sensor of claim 1, wherein said material is glass.

4. The acceleration sensor of claim 1, wherein said material is crystal.

5. An acceleration sensor comprising:
a sensor section, which section comprising a silicon substrate provided with a slit so as a tongue shape segment is formed thereon, a mass substance provided on one surface or both surfaces of said tongue shape segment at an end part and a piezoresistive element or a piezoelectric element which changes its electrical characteristic in accordance with a strain disposed on a straining portion of said tongue shape segment; and
a cap substrate having a hollow in an area facing said mass substance,
wherein said sensor section is held supported by said cap substrate, and
wherein said silicon substrate is directly bonded to said mass substance without an intermediate layer therebetween, and said sensor section and said cap substrate are joined together by direct bonding.

6. The acceleration sensor of claim 5, wherein said mass substance is formed from a material that is different than said tongue shape segment.

7. An acceleration sensor comprising:
a sensor section, which section comprising a silicon substrate provided with a slit so as a tongue shape segment is formed thereon, a mass substance provided on one surface or both surfaces of said tongue shape segment at an end part and a piezoresistive element or a piezoelectric element which changes its electrical characteristic in accordance with a strain disposed on a straining portion of said tongue shape segment, wherein said mass substance is formed from a material that is different than said tongue shape segment; and a cap substrate having a hollow in an area facing said mass substance, wherein said sensor section is held supported by said cap substrate, wherein said silicon substrate is directly bonded to said mass substance, and said sensor section and said cap substrate are joined together by direct bonding.

8. An acceleration sensor comprising:

a sensor section, which sensor section comprising a movable hinge portion in which a strain is caused by an acceleration, a movable mass substance for amplifying the strain of the hinge portion provided with a first and a second movable electrode disposed respectively on upper and lower surfaces in an end part of the hinge portion, and a frame portion surrounding said hinge portion and mass substance so as to support said hinge portion and said mass substance;

a first cap having a first fixed electrode on a surface, which first fixed electrode creating a capacitance coupled with said first movable electrode; and a second cap having a second fixed electrode on a surface, which second fixed electrode creating a capacitance coupled with said second movable electrode, and holding and supporting said sensor section jointly with said first cap, wherein a plurality of first grooves are provided at the outer edge of said frame portion, a first and a second lead electrode are provided in said frame portion for electrically connecting said first movable electrode and second moveable electrode respectively to different ones of said plurality of first grooves, a plurality of second grooves are provided in said first cap, each of said plurality of second grooves are formed at a place corresponding to one of the plurality of first grooves, a third lead electrode is provided in the first cap for electrically connecting said first fixed electrode to one of said plurality of second grooves, a fourth lead electrode is provided in the second cap for electrically connecting said second fixed electrode to a place corresponding to one of said plurality of first grooves, and said first and second grooves are filled with an electroconductive paste.

9. The acceleration sensor of claim 8, wherein said sensor section comprises a silicon plate having top and bottom insulating surfaces, said mass substance and said frame portion comprising a glass plate provided only on one of said top and bottom insulating surfaces by direct bonding or said mass substance and said frame portion comprising two glass plates such that one of said two glass plates is provided on said bottom insulating surface and the other of said two glass plates is provided on said top insulating surface by direct bonding, said first and second caps are formed from glass and are directly bonded to said sensor section such that said sensor section is held and supported by said first and second caps.

10. The acceleration sensor of claim 8, further comprising a piezoresistive element or a piezoelectric element which changes its electrical characteristic by a strain in a place at which a strain is caused by an acceleration.

11. An acceleration sensor comprising:

a sensor section, which section comprising a movable hinge portion having a piezoresistive element or a piezoelectric element provided in a place at which a strain is caused by an acceleration, a movable mass substance for amplifying the strain caused on the hinge portion provided at an end part of the hinge portion and a frame portion surrounding said hinge portion and mass substance so as to support said hinge portion and said mass substance; and a first cap and a second cap for holding and fixing said sensor section therebetween, wherein a plurality of grooves are provided at the outer edge of the first cap, a plurality of lead electrodes are provided in the sensor section for leading electrical connections of the piezoresistive element or the piezoelectric element to respective locations corresponding to said grooves, and said grooves are filled with an electroconductive paste.

* * * * *